Oct. 12, 1965 J. LOVE 3,211,137
INPUT VALVE SYSTEMS FOR INTERNAL COMBUSTION ENGINES
Filed March 12, 1963 2 Sheets-Sheet 1
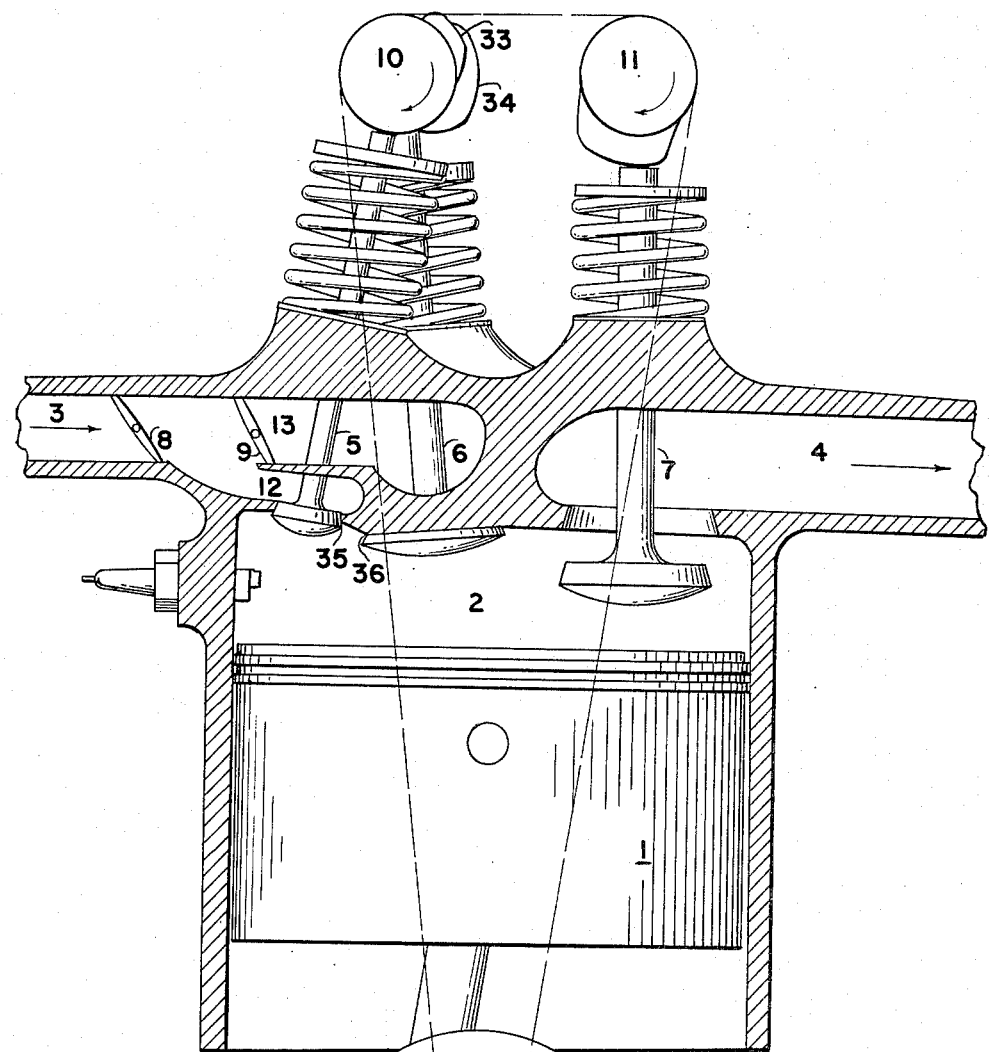
FIG. I
INVENTOR.
John Love INVENTOR.
John Love

United States Patent Office 3,211,137
Patented Oct. 12, 1965

3,211,137
INPUT VALVE SYSTEMS FOR INTERNAL
COMBUSTION ENGINES
John Love, West Orange, N.J.
(89 Brooklake Road, Florham Park, N.J.)
Filed Mar. 12, 1963, Ser. No. 264,579
14 Claims. (Cl. 123—75)

This invention relates to internal combustion engines and primarily to racing type engines of the gasoline drive type. It is well known to the arts that, by retarding the closing of the exhaust valve and advancing the opening of the intake valve in a four cycle internal combustion engine, increased speed and power can be obtained. However, although we unquestionably get more speed and power, it has serious disadvantages as it is impossible to get a slow, smooth idle adjustment, and also it gives very poor gas mileage at all speeds.

Before going into a detailed description of this invention, I will discuss the cause of this erratic idling. In a race type, four cycle internal combustion engine, there is a time period after the opening of the intake valve and before the closing of the exhaust valve when both valves are open at one and the same time. The exhaust gasses in the cylinders, during that said time period, have a choice of two exits; one through the open exhaust valve against an opposing back pressure and the other through the open intake valve aided by the suction in the input manifold. It is, therefore, obvious that during that said time period, more exhaust gasses will pass through the open intake valve back into the intake manifold then will pass out through the open exhaust valve. The amount of these exhaust gasses that are blown back into the input manifold increase with the reduction of the motor speed and contaminate the fuel mixture entering all other cylinders. Therefore, no smooth, slow idle adjustment can possibly be obtained. Modern engine designers rely solely on high speed idling and the inertia of the inward rush of fuel to overcome this disadvantage.

The primary object of this invention is the introduction of a plurality of intake valves and throttles so arranged, timed and controlled that all the above mentioned disadvantages are completely eliminated. Other objects and advantages will be obvious from the following description.

FIGURE 1 shows a cylinder and manifold of my invention.

Figure 3:
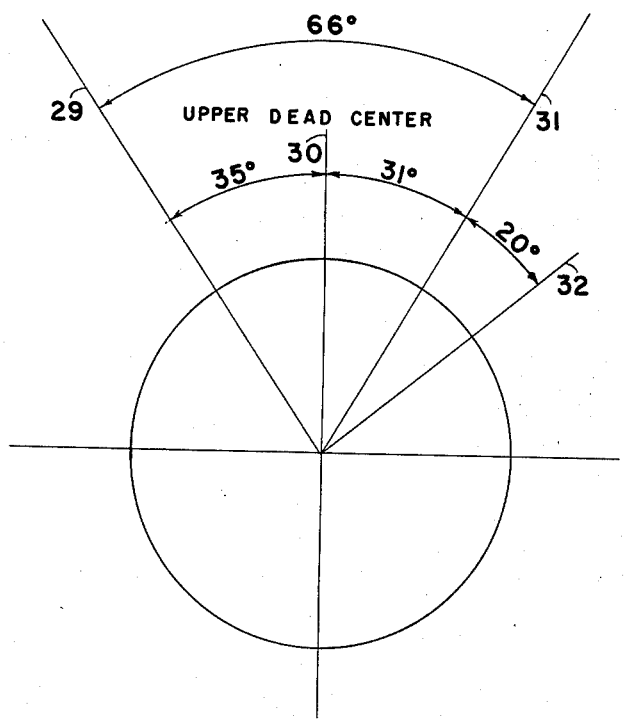
FIGURE 3 is a chart illustrating a timing arrangement.

In the drawing, FIG. 1 illustrates, by way of exaggerated semi-schematic drawing, a single cylinder of a multi-cylindered four cycle internal combustion engine, comprising a piston 1, a combustion chamber 2, an input manifold 3, an exhaust manifold 4, a secondary intake valve 5, a primary intake valve 6, an exhaust valve 7, a primary throttle valve 8, a secondary throttle valve 9, a pair of cam shafts 10 and 11, said cam shaft 10 having fixed lobes 33 and 34, a primary input conduit 13 and a secondary input conduit 12, secondary and primary input ports 35 and 36.

Figure 2:
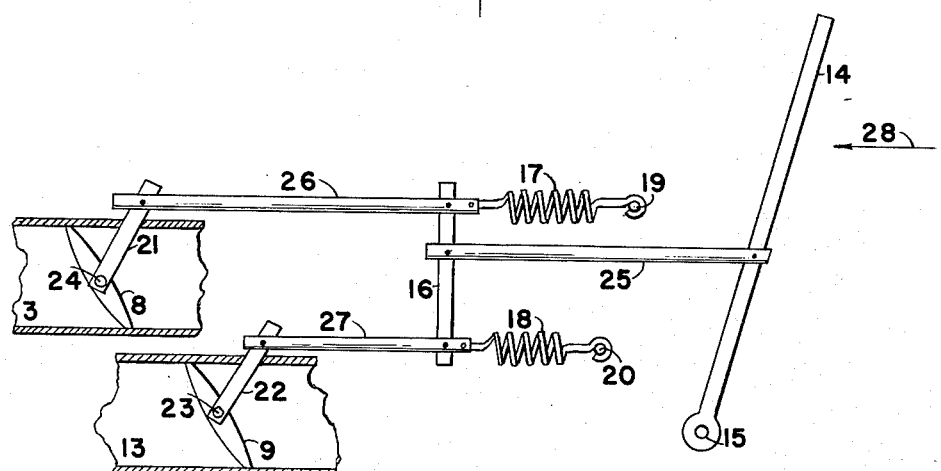
FIGURE 2 is a schematic of throttle valve operating mechanism.

FIG. 2 shows, by way of semi-schematic diagram the principle of the operating mechanism for the opening and closing of the primary and secondary throttle valves 8 and 9, which comprises an accelerator pedal 14 turnably mounted on its fixed pivot 15, an eccentric differential bar 16 with its ends connected to pull spring 17 and 18 which are connected to their respective fixed points 19 and 20 thence through connecting rods 26 and 27, which in turn are connected to two throttle valve lever arms 21 and 22 which are fixed to the said throttle valves 8 and 9 through their respective axles 23 and 24. It will be noted that when the accelerator pedal 14 is moved in the direction of the arrow 28, the connecting rod 25, being connected off center to the differential bar 16, would apply movement to the connecting rod 26 and thence to the throttle valve lever 21, thence to the primary throttle valve 8 through its axle 24. When the said primary throttle valve is opened to its maximum, further and lesser movement of the accelerator pedal 14 through a similar linkage 25, 16, 27, 22, and 23 will fully open the said secondary throttle valve 9. A study of this will show that it would take about 75% travel of the accelerator pedal 14 to fully open the primary throttle valve 8 and only about 25% to fully open the secondary throttle valve 9.

The primary throttle valve 8, FIG. 1 can be classified as the main throttle valve, which we have in use today, which is normally associated with the carbureter control linkage and adjusted for the desired idling speed. The secondary throttle valve 9 remains closed up to the maximum opening of the primary throttle valve 8. It will be noted that the secondary throttle valve 9 will normally remain closed during idle and moderate cruising speeds and therefore block off the primary intake valve 6 leaving the only fuel inlet to the combustion chamber 2 entirely to the secondary intake valve 5. This is equivalent, in effect, to the complete removal of the secondary intake port and input valve 6 from the engine.

FIG. 3 shows, in chart form, the actual timing arrangement of a popular 1961 American sports car, in which the intake valve opens 35 degrees before upper dead center and the exhaust valve closes 31 degrees after upper dead center, thus making it a total of 66 degrees of a revolution of the crank shaft in which both intake and exhaust valves are open at one and the same time. At the exhaust side there is pressure, at the intake side there is suction with a clear passageway from the intake manifold to the exhaust manifold, so it is obvious that, during the period under discussion, more exhaust gasses will flow back into the intake manifold than will pass out into the exhaust system.

Also in FIG. 3, point 29 indicates the position where the primary intake valve 6 opens, point 31 indicates the closing of the exhaust valve 7, point 32 indicates a suggested time for the opening of the secondary intake valve 5 relative to the closing time of the said exhaust valve 7. Thus the said secondary intake valve 5 opens 20 degrees after the closing of the said exhaust valve 7 or 86 degrees after its companion, the said primary intake valve 6. It must be herewith understood that when an exhaust valve closes, in any type of timing, it leaves the combustion chamber under pressure greater than that in the intake manifold and if we opened the intake valve simultaneously with the closing of the exhaust valve there would be a rush of exhaust gasses back into the intake manifold contaminating the fuel mixture therein. It has been estimated that it would take at least 20 degrees of crankshaft travel after the said exhaust valve 7 closes, to enable the piston to travel far enough to reduce the combustion chamber pressure below atmospheric sufficient to match the suction in the intake manifold.

The operation of this arrangement is very simple. Under idle and normal cruising speeds, the input conduit 13 would remain completely closed thus rendering the secondary intake valve 6, which we will consider being race timed, completely ineffective. When wide open throttle operation is desired, the primary input valve 6 becomes effective through the opening of the secondary throttle valve 9 thus giving full advantage of race operation. Furthermore, the operator of a motor vehicle, embodying this invention, need not be aware of its presence other than that little extra push on the accelerator to open the high speed throttle valve 9 and the difference in engine response.

It must be understood that the accompanying drawings are in no way intended for structural design, merely to illustrate the basic principle employed in this invention and it must be further understood that many arrangements of the linkage from the accelerator pedal 28 to the throttle valves 8 and 9 can be designed to give the same end results likewise, a plurality of carbureters with individual input conduits could be used. However, any other arrangement is herewith deemed to come within the scope of this invention. Furthermore, for the sake of easier explanation, two cam shafts are shown wherein, with the proper design, one could be used with equal success.

I claim:

1. In an internal combustion engine, a main fuel input manifold containing a throttle closing means, a primary conduit connecting the said main fuel input manifold with the primary input port to the combustion chamber, a primary intake valve controlling the opening and closing of the said primary input port, said primary intake valve having its own actuating means, a secondary conduit, also containing a throttle closing means, leading from the said main fuel input manifold to a secondary input port to the said combustion chamber, a secondary intake valve controlling the opening and closing of the said secondary input port, said secondary intake valve having its own actuating means, means to manually and differentially operate both said primary and secondary throttle valves in tandem.

2. In combination in an internal combustion engine, a main fuel input manifold containing a throttle closing means, a primary conduit connecting the said fuel input manifold thence to a primary input port to the combustion chamber of the said internal combustion engine, a primary intake valve controlling the opening and closing of the said primary input port to the said combustion chamber, said primary intake valve having its own independent lobe on the fuel input controlling cam shaft, a secondary conduit containing a throttle closing means leading from the said main fuel input manifold to a secondary input port thence to the said combustion chamber, a secondary intake valve controlling the opening and closing of the said secondary input port, said secondary intake valve having its own independent actuating lobe on the said fuel input controlling cam shaft, means to manually and differentially operate said throttle closing means in tandem.

3. In the fuel input section of an internal combustion engine, having at least one combustion chamber, a primary input conduit containing a primary throttle valve and a secondary throttle valve, a secondary input conduit branching off from the said primary input conduit between the said primary and secondary throttle valves, said primary input conduit terminating at a primary fuel intake valve at the entrance to the said combustion chamber, said primary fuel intake valve having its own individual opening and closing means and timed to open before upper dead center, said secondary input conduit terminating at a secondary fuel intake valve at a different entrance to the same said combustion chamber, said secondary fuel intake valve having its own individual opening and closing means and timed to open after upper dead center and means to manually and differentially actuate the said primary and the said secondary throttle valves in tandem.

4. In combination in the fuel input section of an internal combustion engine having at least one combustion chamber, a primary input conduit containing dual throttle actuating means, a secondary input conduit connected to the said primary input conduit between the said dual throttle actuating means and means to manually and differentially operate the said dual throttle actuating means in tandem, said primary input conduit terminating at a fuel intake valve at the entrance to the said combustion chamber, said secondary input conduit terminating at a different fuel intake valve at another entrance to the same said combustion chamber, both said fuel intake valves having their own independent actuating means and having dissimilar timing.

5. In combination in a device for the purpose described, a primary fuel input conduit and a secondary fuel input conduit, dual throttle valves to control the amount of fuel flow in the said primary and secondary fuel input conduits, a primary intake valve terminating the said primary fuel input conduit at the entrance to a combustion chamber, said primary intake valve having its own independent actuating means, a secondary intake valve terminating the said secondary fuel input sonduit at a different entrance to the same said combustion chamber, said secondary intake valve having its own independent actuating means, both said primary and secondary intake valves having dissimilar timing, a fuel input manual controlling means comprising an accelerator lever connected by linkage to the said dual throttle valves, said linkage being designed to actuate both said throttle valves in tandem and having a greater amount of accelerator lever movement to fully actuate one of the said dual throttle valves and a lesser amount of accelerator lever movement to fully actuate the other said throttle valve.

6. In the fuel input section of an internal combustion engine having at leastone combustion chamber, a primary input conduit and a secondary input conduit branching out of the said primary input conduit, a throttle valve in the said primary input conduit ahead of the junction of the said primary input conduit and the said secondary input conduit, a secondary throttle valve in the said primary input conduit after the junction to the said secondary input conduit, a primary intake valve and a secondary intake valve located at the terminal end of their respective primary and secondary input conduits at different entrances to the said combustion chamber, said primary and secondary intake valves having their own individual actuating means for dissimilar timing and means for manual and differential operation of both said throttle valves in tandem.

7. In the fuel input section of an internal combustion engine, having at least one combustion chamber, a primary input conduit and a secondary input conduit containing dual throttle valves, said dual throttle valves being capable of being manually and differentially actuated in tandem, a primary fuel intake valve terminating the said primary input conduit at the entrance to the said combustion chamber, said primary fuel intake valve having its own independent actuating means, a secondary fuel intake valve terminating the said secondary input conduit at a different entrance to the same said combustion chamber, said secondary fuel intake valve having its own independent actuating means, both said primary and secondary fuel intake valves having dissimilar timing.

8. In the fuel input section of an internal combustion engine having at least one combustion chamber, a primary input conduit with a secondary input conduit branching out from the said primary input conduit, a primary and a secondary throttle valve to control the fuel flow in the said primary and secondary input conduits, means to manually and differentially actuate the said primary and secondary throttle valves in tandem, said primary input conduit and said secondary input conduit terminating at different entrances to the same said combustion chamber, said entrances being opened and closed by a primary fuel intake valve and a secondary fuel intake valve, said primary fuel intake valve being timed to open before upper dead center and said secondary fuel intake valve being timed to open after upper dead center.

9. In combination in the fuel input section of an internal combustion engine having at least one combustion chamber, a primary input conduit containing a primary and secondary throttle valve, said primary input conduit terminating at a primary fuel intake valve opening to the said combustion chamber, a secondary input conduit from the said primary input conduit, terminating at a secondary fuel intake valve opening to the same said combustion chamber, said primary and secondary fuel intake valves having their own individual actuating means and dissimilar timing, means to manually and differentially operate both said primary and secondary throttle valves in tandem.

10. In combination in a device for the purpose described having at least one combustion chamber, a primary input conduit containing a primary throttle valve and a secondary throttle valve, a secondary input conduit branching off from the said primary input conduit between the said primary and secondary throttle valves, said primary input conduit terminating at a primary fuel intake valve at the entrance to the said combustion chamber, said primary fuel intake valve having its own individual opening and closing means and timed to open before upper dead center, said secondary input conduit terminating at a secondary fuel intake valve at a different entrance to the same said combustion chamber, said secondary fuel intake valve having its own individual opening and closing means and timed to open after upper dead center, a fuel input controlling means comprising an accelerator lever connected by linkage to the said primary and secondary throttle valves, said linkage being designed to actuate the said primary and secondary throttle valves in tandem and having a greater amount of accelerator lever movement to fully actuate one of the said throttle valves and a lesser amount of accelerator lever movement to fully actuate the other said throttle valve.

11. In the fuel input section of an internal combustion engine of the class described, having at least one combustion chamber, an input manifold containing a throttle valve, a primary conduit and a secondary conduit from the said input manifold to the said combustion chamber, a throttle valve in the said primary conduit, means to manually and differentially actuate both said throttle valves in tandem, a primary fuel intake valve and a secondary fuel intake valve terminating the said primary and secondary conduits at different entrances to the said combustion chamber, said fuel intake valves having their own individual actuating means and one being timed to open before upper dead center and the other being timed to open after upper dead center.

12. In combination in a device for the purpose described, said device having at least one combustion chamber, a primary fuel input conduit containing a primary throttle valve and a secondary throttle valve, a secondary fuel input conduit branching off from the said primary fuel input conduit between the said primary throttle valve and the said secondary throttle valve, a primary fuel intake valve at the terminal end of the said primary fuel input conduit to control the opening and closing of an input port to the said combustion chamber and timed to open before upper dead center, a secondary fuel intake valve at the terminal end of the said secondary input port to control the opening and closing of an input port to the same said combustion chamber and timed to open after upper dead center, said primary and said secondary throttle valves being capable of manual operation in a differential and tandem movement.

13. In the fuel input section of an internal combustion engine having at least one combustion chamber, a primary fuel input conduit and a secondary fuel input conduit, dual throttle valves in the said primary fuel input conduit, said secondary input conduit branching off from the said primary fuel input conduit between the said dual throttle valves, a primary fuel intake valve terminating the said primary fuel input conduit at the entrance to the said combustion chamber, said primary fuel intake valve having its own individual opening and closing means and timed to open before upper dead center, a secondary fuel intake valve terminating the said secondary fuel input conduit at a different entrance to the same said combustion chamber, said secondary fuel intake valve having its own individual opening and closing means and timed to open after upper dead center, said dual throttle valves being capable of manual operation differently and in tandem.

14. In combination in a device for the purpose described, a combustion chamber, a plurality of input conduits containing a plurality of throttle valves, said throttle valves being capable of being manually opened and closed in tandem, a fuel intake valve at the terminal end of each one of the said plurality of input conduits at different entrances to the said combustion chamber, each one of the said plurality of intake valves having its own individual actuating means and differently timed.

References Cited by the Examiner
UNITED STATES PATENTS

| | | | |
|---|---|---|---|
| 1,152,031 | 8/15 | Lobdell | 123—127 |
| 1,347,598 | 7/20 | Sturm | 123—52 |
| 1,568,638 | 1/26 | Summers | 123—191 |
| 1,755,817 | 4/30 | Dibley | 123—75 |
| 2,240,088 | 4/41 | Birkigt | 123—75 |
| 2,361,250 | 10/44 | Vincent | 123—127 |
| 2,448,043 | 8/48 | Nash | 123—127 |
| 2,460,693 | 2/49 | Hall | 74—471 |
| 2,480,083 | 8/49 | McMillan | 74—471 |
| 2,940,432 | 6/60 | Hijszeler | 123—76 |

FOREIGN PATENTS

| | | |
|---|---|---|
| 227,881 | 1/25 | Great Britain. |

MARK NEWMAN, *Primary Examiner.*

FRED E. ENGELTHALER, *Examiner.*